(12) United States Patent  (10) Patent No.: US 9,195,310 B2
Clausen  (45) Date of Patent: Nov. 24, 2015

(54) CAMERA CURSOR SYSTEM

(75) Inventor: William Stryker Clausen, Kirkland, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 13/544,493

(22) Filed: Jul. 9, 2012

(65) Prior Publication Data

US 2014/0009396 A1  Jan. 9, 2014

(51) Int. Cl.
  *G09G 5/00* (2006.01)
  *G06F 3/01* (2006.01)
  *G06F 3/03* (2006.01)

(52) U.S. Cl.
  CPC .............. *G06F 3/017* (2013.01); *G06F 3/0304* (2013.01)

(58) Field of Classification Search
  CPC ................................. G06F 3/005; G06F 3/017
  USPC .................................................. 345/173, 156
  See application file for complete search history.

(56) References Cited

U.S. PATENT DOCUMENTS

| 6,498,628 | B2 | 12/2002 | Iwamura | |
|---|---|---|---|---|
| 2002/0015022 | A1 | 2/2002 | Ein-Gal | |
| 2002/0118880 | A1* | 8/2002 | Liu et al. | 382/199 |
| 2008/0273755 | A1* | 11/2008 | Hildreth | 382/103 |
| 2009/0315825 | A1 | 12/2009 | Cauchi | |
| 2010/0048241 | A1 | 2/2010 | Seguin et al. | |
| 2010/0090949 | A1 | 4/2010 | Tianqiao et al. | |
| 2010/0329511 | A1* | 12/2010 | Yoon et al. | 382/103 |
| 2011/0157020 | A1 | 6/2011 | Huang et al. | |
| 2012/0113241 | A1* | 5/2012 | Sundaresan et al. | 348/77 |

* cited by examiner

*Primary Examiner* — Koosha Sharifi-Tafreshi
*Assistant Examiner* — Chun-Nan Lin
(74) *Attorney, Agent, or Firm* — Jefferson IP Law, LLP

(57) ABSTRACT

An apparatus and method for controlling a portable device are provided. The method includes a method for controlling a portable device, the method including finding at least one object to be tracked in view of a camera, differentiating motion of the at least one object from changes in camera input other than the at least one object in the camera's view, tracking the motion of the at least one object, and executing a function according to the tracked motion.

16 Claims, 8 Drawing Sheets

CAMERA CURSOR SYSTEM

BACKGROUND OF THE INVENTION

1. Field of the Invention

The present invention relates to an apparatus and method for a camera cursor system. More particularly, the present invention relates to an apparatus and method for controlling a cursor on a mobile wireless computer device.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile terminals as described above may be implemented, for example, as tablets, smartphones, or other mobile wireless computers. They are frequently implemented with a touchscreen feature, that is, a screen that functions both as a visual display and as a touch-sensitive input. Typically, the elements displayed on the touchscreen may be selected, adjusted, opened, dragged to a new location, etc., by touching or tapping an icon or other input, in order to control a corresponding function of the mobile terminal or of an application installed on the mobile terminal. For example, a user may tap on a speaker icon to open an audio volume control function; the audio volume control function may display a slider or scrollbar, which the user may tap to select ("grab" the control), move the finger on the touchscreen ("drag") to set a new audio volume setting; and then the user may lift the finger from the touchscreen to allow the volume control function to close.

Use of a touchscreen interface as described above has the advantage of being intuitively easy to understand. However, it has several drawbacks as well. For example, the display, particularly the element of the display the user is most interested in, is obscured by the user's finger and not visible during the touch input. For another example, the user must move his finger to whatever location on the screen is appropriate; this may be difficult or impossible for a user who does not have one hand free to hold the mobile terminal while using the other hand for the touch input. Such a user may be driving a car, simultaneously using a mobile phone in a situation where there is no convenient or safe surface to set the mobile terminal on, may not have full use of all fingers and both hands due to an accident or injury, etc.

FIG. 1 is a front view of a portable terminal according to the related art.

Referring to FIG. 1, a portable terminal 100 includes a touchscreen interface 110, an optional front-facing camera 120, and an optional one or more keys 130. The camera 120 is used to take pictures of the user or for video conferencing. The touchscreen interface 110 is used both to display output and to sense user inputs. For example, a user may tap and drag an icon to move a displayed object representing an application, double tap the icon to launch the application, use a two-fingered 'pinch' or 'spread' input to change a scale of the display, tap or type on keys of a displayed keyboard, etc. The keys 130 may be used to turn the portable terminal 100 on or off, to awaken the portable terminal 100 if it is in a sleep mode, to adjust a sound volume, etc. If the portable terminal 100 includes audio functions such as a telephone, there may be a speaker output 140 and a microphone input 150 as well.

FIG. 2 is a rear view of a portable terminal according to the related art.

Referring to FIG. 2, portable terminal 100 includes a rear-facing camera 210 and an optional flash 220. The rear-facing camera 210 is used for taking higher resolution photographs or video than are taken by the front-facing camera 120. The flash 220 is used when the portable terminal 100 detects a low light situation when taking a photograph.

The portable terminal 100 of the related art has a user interface requiring particular user inputs, i.e., touching or tapping at the location on an icon, to use. A user will typically need to hold the portable terminal 100 with one hand and tap or touch the touchscreen input with a finger of the other hand, or set the portable terminal 100 down on a surface such as a table top, in order to enter the required inputs.

There are attempts in the related art to use computer vision techniques to track a moving object, such as the Microsoft Kinect video game accessory. However, such techniques of the related art require a stable light environment, and cannot function in a variable light mobile environment.

Accordingly, there is a need for an apparatus and method for providing improved user input functionality to handheld devices such as portable terminals.

SUMMARY OF THE INVENTION

Aspects of the present invention are to address at least the above-mentioned problems and/or disadvantages and to provide at least the advantages described below. Accordingly, an aspect of the present invention is to provide an apparatus and method for controlling a portable device.

In accordance with an aspect of the present invention, a method for controlling a portable device is provided. The method includes finding at least one object to be tracked in view of a camera, differentiating motion of the at least one object from changes in camera input other than the at least one object in the camera's view, tracking the motion of the at least one object, and executing a function according to the tracked motion.

In accordance with another aspect of the present invention, a method for controlling a portable device is provided. The method includes detecting a user's touch of at least one touch input area and controlling a function of the device according to movement of the user's touch on the at least one touch input area, wherein the at least one touch input area is located at a position of a thumb or fingertip of a hand holding the device.

In accordance with yet another aspect of the present invention, a method for controlling a portable device is provided. The method includes detecting a user's thumb or finger holding the device and locating a position of at least one virtual button at a location of the thumb or finger.

In accordance with still another aspect of the present invention, a method for controlling a portable device is provided, where the device includes at least one physical or virtual button and at least one camera, touch input area, or joystick. The method includes selecting the at least one physical or virtual button to determine whether the device responds to events detected by the at least one camera, touch input area, or joystick, wherein the at least one physical or virtual button and the at least one camera, touch input area, or joystick are located at a position of a thumb or finger of a hand holding the portable device.

In accordance with yet another aspect of the present invention, an apparatus for controlling a portable device is provided. The apparatus for controlling the portable device includes a camera, and a controller, for detecting at least one thumb or finger of a user in a frame captured by the camera, for differentiating motion of the at least one finger from changes in pixels other than the thumb or finger in the camera's view, for tracking a motion of the thumb or finger, and for executing a function of the device according to the tracked motion.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for a camera cursor system. The system may be employed, for example, in a portable terminal, but is not limited thereto. For example, the camera cursor system may be implemented in a remote control for a television or an audio-video entertainment system. Other uses are of course possible without departing from the spirit or scope of the disclosed invention.

Figure 1:
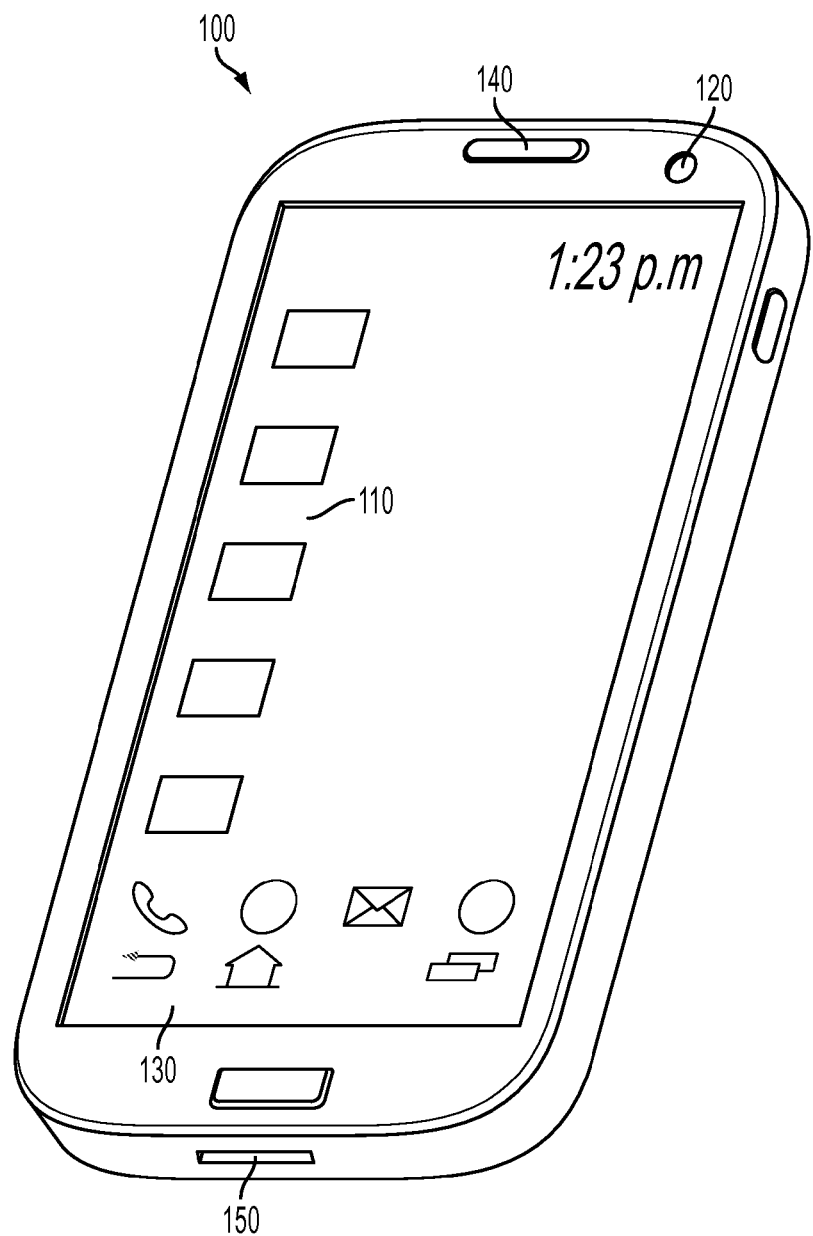
FIG. 1 is a front view of a portable terminal according to the related art.
Figure 2:
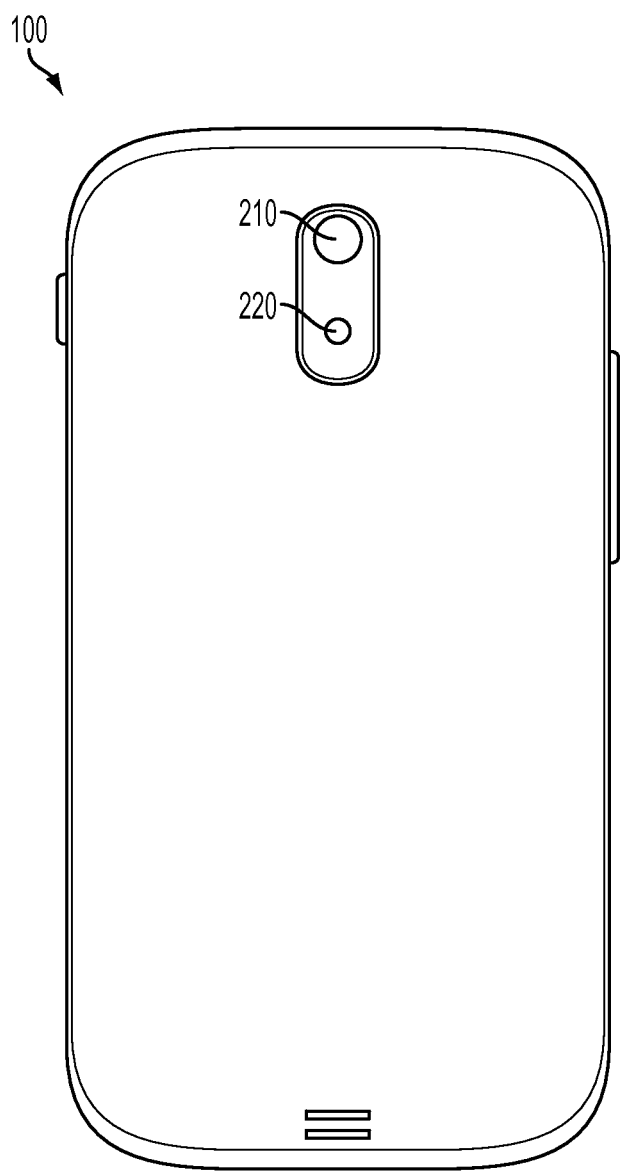
FIG. 2 is a rear view of a portable terminal according to the related art.
Figure 3:
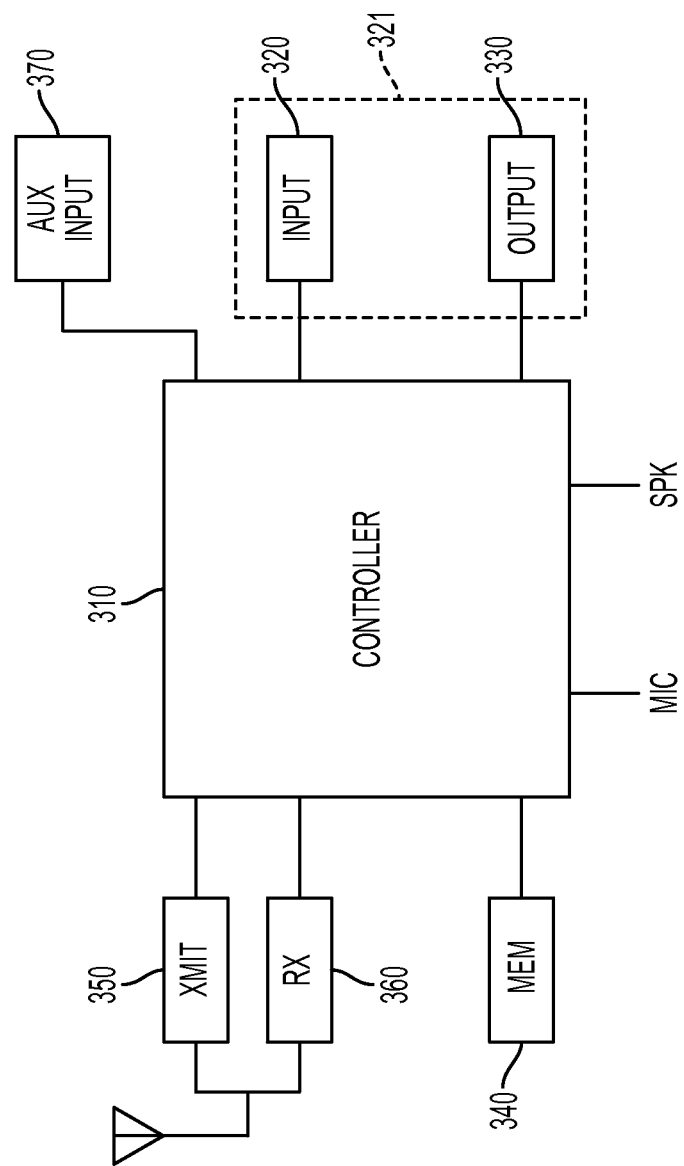
FIG. 3 is a block diagram of a portable terminal according to an exemplary embodiment of the present invention.

FIG. 3 is a block diagram of a portable terminal according to an exemplary embodiment of the present invention.

Referring to FIG. 3, a portable terminal 300 includes a controller 310, a primary input unit 320, an output display 330, a memory 340, a transmitter 350, a receiver 360, an auxiliary input 370, a microphone MIC, and a speaker SPK.

The controller controls the functions of the portable terminal 300. The primary input unit 320 and output display 330 may be combined as a touchscreen 321. The memory 340 is used to store both executable software, such as applications or an operating system, and data, such as audio recordings or digital photographs. The transmitter 350 and receiver 360 are used for wireless communication, such as telephone, WiFi, Bluetooth, etc. The microphone MIC and speaker SPK are used for audio input and output functions.

The auxiliary input 370 is an optional input according to exemplary embodiments of the present invention. That is, the present invention may use the existing touchscreen input, and may also use another input unique to the present invention, such as one or more location-specific cameras or touchpads on the front or rear of the portable terminal 300.

Figure 4:
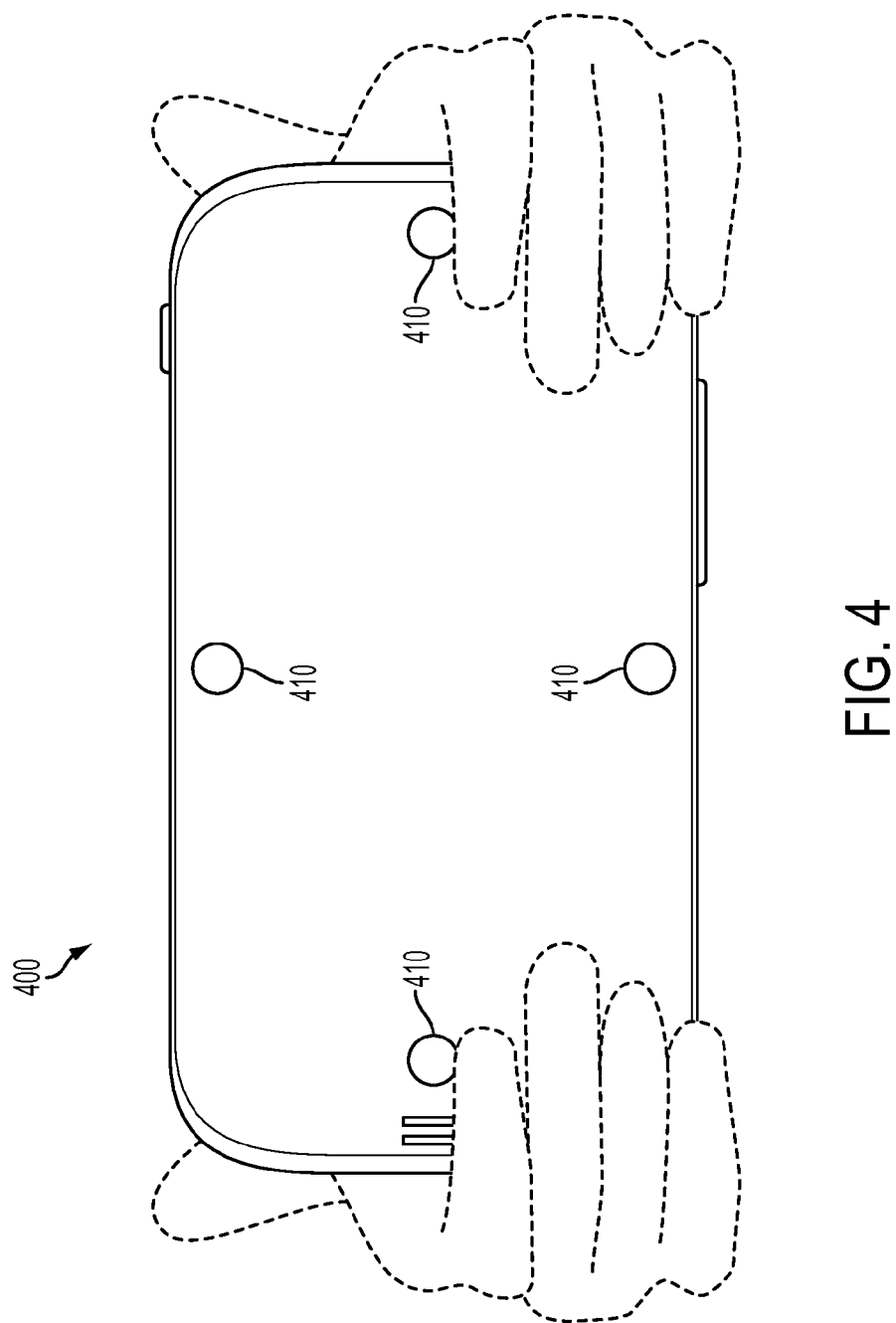
FIG. 4 illustrates a rear view of a portable terminal according to an exemplary embodiment of the present invention.

FIG. 4 illustrates a rear view of a portable terminal according to an exemplary embodiment of the present invention.

Referring to FIG. 4, in a first exemplary embodiment a portable terminal 400 includes at least one camera 410 on the front, back, or sides. Each camera 410 may be used as a control input of the exemplary embodiment, and may alternatively also be implemented with a camera for image or video capture as is known in the related art. That is, the camera 410 is not required to be a special-purpose camera.

The camera 410 tracks various movements and motions of one or more of a user's fingers in view of the camera 410 to move a cursor, select an object at the cursor location, adjust objects, etc. In this exemplary embodiment, the user's fingers can reproduce the functionality of a desktop computer mouse. The cameras may be located on the front or back of the portable terminal; the user may use fingers in view of a back camera, a thumb in view of a front camera, or a combination thereof. Cameras may be located on or near two or more edges of the portable terminal, such that they may have independent input from the user's two hands. The cameras will detect various motions of one or more fingers, such as pointing, curling one or more fingers, crossing fingers, extending or flicking one or more fingers, moving a finger location or orientation including closer to or further from the camera, or a combination of these. Binocular cameras, an ultrasound sensor, an infrared sensor, or other known means may be used to determine a distance of each finger from the camera.

Figure 7:
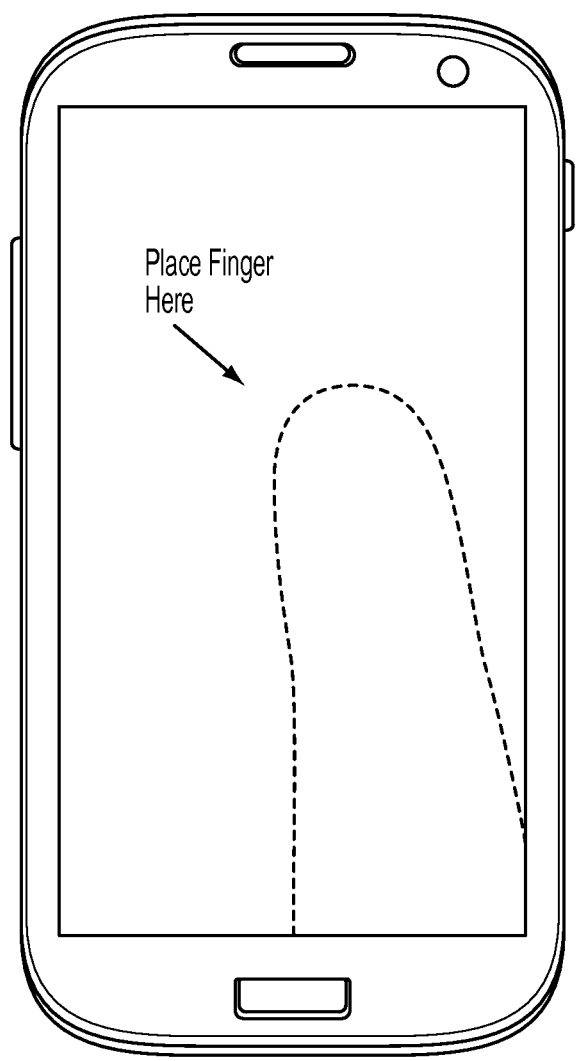
FIG. 7 illustrates a sample screen display during a user input to a portable terminal according to an exemplary embodiment of the present invention.

FIG. 7 illustrates a sample screen display during a user input to a portable terminal according to an exemplary embodiment of the present invention.

Referring now to FIG. 7, the portable device may be trained to track the user's finger or other object. The user may be assisted or prompted to train or calibrate the device. For example, as depicted in FIG. 7, a user may be presented with a template or guide to assist the portable device in determining which areas in the camera view include the finger or object to be tracked. By placing the finger or object to be tracked in the designated area of the camera's view, the portable device is able to more quickly and easily identify the shape, skin tone, total area, etc., of the finger or object to be tracked.

Note that although a finger is used in this example, in an exemplary embodiment the object to be tracked may be any object that is distinguishable from a background. For example, a user may wish to track a stylus held in the hand, to avoid having to pick up and put down the stylus while the user performs different tasks. Similarly, a user may train the portable device to track other objects farther from the camera. For example, a user performing music may train the device to track one or both feet so as to provide an additional control input while the user's hands are busy manipulating a musical instrument.

Figure 8B:
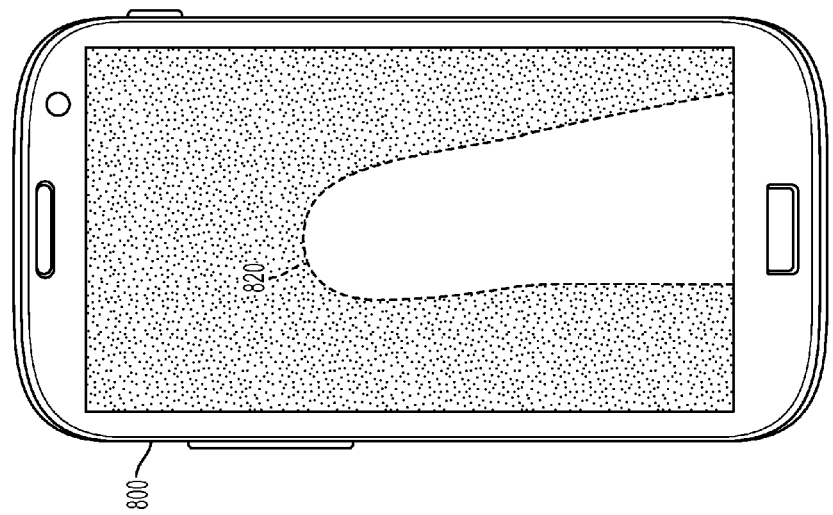
FIGS. 8A and 8B illustrate views of a user input to a portable terminal according to an exemplary embodiment of the present invention.
Figure 8A:
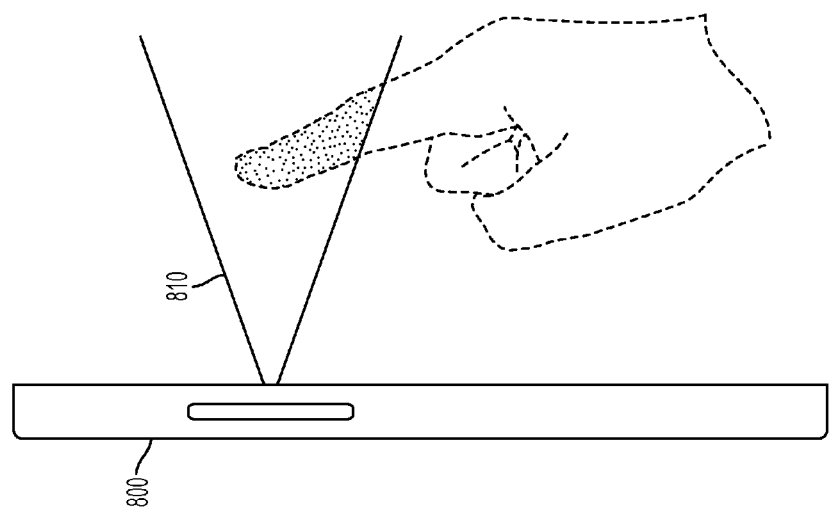

FIGS. 8A and 8B illustrate views of a user input to a portable terminal according to an exemplary embodiment of the present invention.

Referring now to FIG. 8A, a visible or infrared light source 810 may be included in the portable device 800 so that the fingers will be visible to the cameras even in a low light situation. A color or wavelength of the visible or infrared light source 810 may be selected so as to improve an efficiency of detecting an object to be tracked. For example, a purple light may be used to improve the ability to detect skin tones near the camera while being indistinguishable on far away objects. Multiple colors or wavelengths may be selected and projected concurrently or sequentially, as different tracked objects may be more easily detected with different colors of light projected. Referring now to FIG. 8B, the tracked object, in this example a finger, may thus be provided with a high contrast or high visibility appearance to the camera in comparison to other input in the view of the camera. Thus, the identified tracked area 820 of the finger or object may be more quickly and efficiently determined Although the exemplary portable terminal 400 as shown in FIG. 4 is depicted held in a landscape orientation, the present invention is not limited thereto. For example, the portable terminal 400 is depicted with cameras 410 on all four edges of the back of the device, such that a camera 410 may detect the motion of fingers of either of a user's hands holding the portable terminal 410 in landscape or portrait orientation.

Similarly, the exemplary portable terminal 400 is described as tracking a user's fingers, but the present invention is not limited thereto. Any object may be used as the tracked input. More particular, a user may determine what object may be the tracked input. The determined object is photographed against a uniform color background, preferably white. Photographing the object from multiple perspectives will increase the accuracy of recognizing the object.

The user-determined object is located in a picture with an edge-detection algorithm according to the object's shape and color, as determined by the perspective photographs. The portable terminal then sets camera input, such as pixels, determined to be part of the object to a first setting, such as black, and all input not determined to be part of the object to a second setting, such as white. The portable terminal then tracks the camera inputs of the first setting, corresponding to the tracked object.

Alternatively, a feature detection algorithm such as are known in the related art may be used to determine whether the object has any unique or identifiable features to track. If so, those features are tracked to determine the object's position, orientation, distance from camera, etc. If not, an alternative method such as template matching may be used instead.

Figure 5:
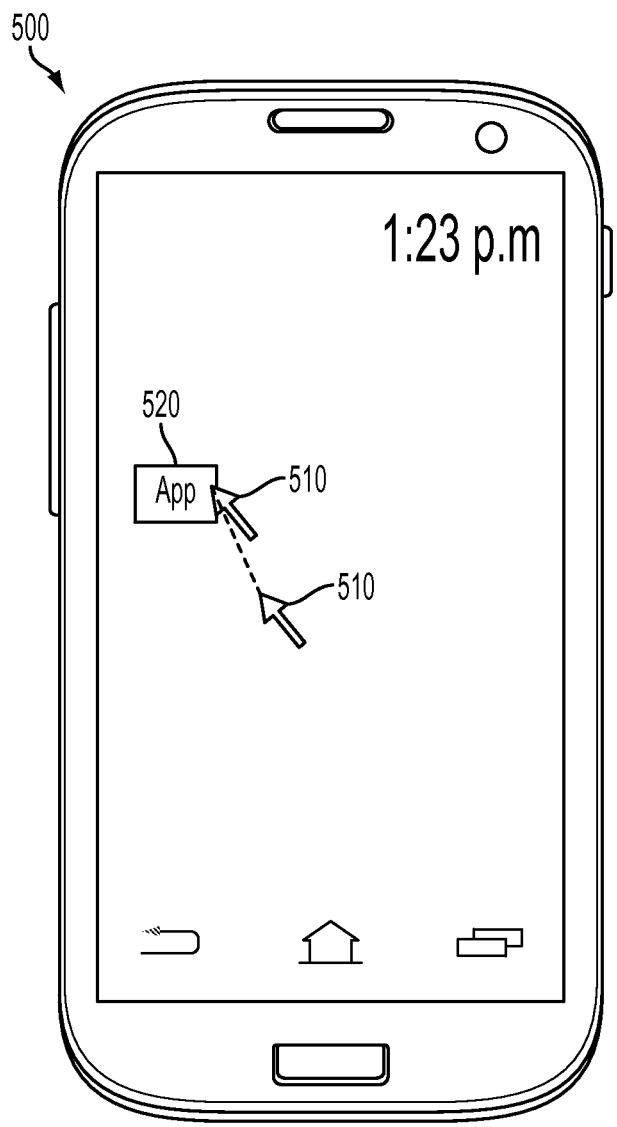
FIG. 5 illustrates an exemplary screen display during a user input to a portable terminal according to an exemplary embodiment of the present invention.

FIG. 5 illustrates an exemplary screen display during a user input to a portable terminal according to an exemplary embodiment of the present invention.

Referring to FIG. 5, a cursor 510 may be controlled to move to a screen location of an application 520 on the screen 500. The application 520 may then be selected, for example, by a button or by any recognized corresponding motion detected by the camera.

Figure 6:
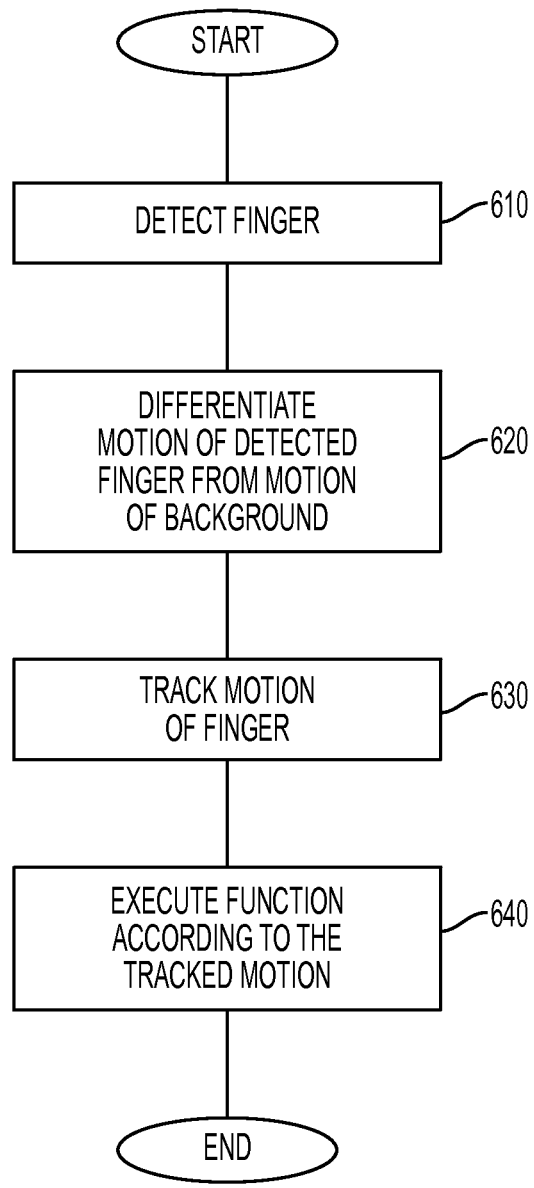
FIG. 6 is a flowchart of a method of controlling a portable device according to an exemplary embodiment of the present invention.

FIG. 6 is a flowchart of a method of controlling a portable device according to an exemplary embodiment of the present invention.

Referring now to FIG. 6, in this exemplary embodiment there are problems of calibration. In practice it is difficult for the camera to locate and distinguish one or more desired objects such as fingers from all backgrounds. This varies further according to the user; for example, dark skin tones are more difficult than light skin tones for the portable terminal to distinguish. There are additional difficulties in tracking a 'moving target', in part because the colors being tracked change as the target moves and the light changes. The moving target problem becomes particularly complex in a case of a mobile environment, where the user may be physically moving indoors, outdoors, through various shaded and shadow areas, etc.

Object detection is less complicated when a background is static. In this case, a matrix of each frame can be subtracted from a matrix of the previous frame. The leftover values will either be black in a case where the pixel value has not changed, or a non-zero value. The non-zero values represent a case where the colors in a pixel have changed. By using information about which pixels have changed in conjunction with information of the current frame, such as edges and color, object detection against a static background is manageable.

However, in the case where the background is not a constant matrix, such as a user walking with a handheld device, the background subtraction method cannot work because non-zero pixels, representing change from the previous frame, may still be background pixels that should not be tracked.

In this exemplary embodiment, the unstable background problem is addressed by enhancing a region of a frame where the tracked object exists. In step 610 of FIG. 6, a user's finger is first detected in view of a camera. For example, in the case of tracking a user's finger, most of the analysis of the frame exists in a black-and-white environment. After identifying all pixels that are potential matches for skin tone, all other pixels are set to 0 (black), and all potential matches are set to white. That is, each pixel that could possibly be a user's skin tone is kept and each pixel that cannot is discarded at this point. The user's finger is identified by finding an area of pixels that are potential matches and are grouped together in the size and shape of a finger.

In order for calibration to occur, the user's finger must be present onscreen. In order to accurately track the finger, a dense population of white pixels that match the user's skin tone and the shape of a finger must be located. The density of the tracked region of white pixels that correspond to the user's finger is dynamically changed by dynamically adjusting the ranges of acceptable values on each frame or at specific intervals of frames. This technique is improved by minimizing the white pixels outside the region.

By first setting pixels which are not potential matches to a user's skin tone to 0 (black), and then similarly also setting pixels which do not match the size or shape of a finger to be 0 (black) in step 620, background motion can be effectively eliminated from consideration. Thus, if a user is using the portable terminal while walking down the street, changing pixels in view of the camera other than the user's fingers, such as buildings, the clothes of people walking by, etc., may be removed from consideration.

In tracking an object using computer vision, only a small amount of information is available. Specifically, there is an array of values which map to pixels based on camera input. In order to track human skin tones, there are a number of color spaces available. Most of these use three variables to represent a color. One color space used is Red, Green, Blue (RGB), which mixes percentages of the three colors to 'mix' a color. Another implementation uses Hue, Saturation, and Value (HSV) measurements of 8 bits each (24 bits total). HSV uses a cylindrical color chart to represent hue, saturation, and value. This data can be used to retrieve important information about the image, most notably, edges and color. These are the 'building blocks' of object tracking. While there are numerous color spaces, HSV has been found to be the easiest and most accurate color space to use in this computer vision context.

A crucial element of a color space is a density plot for skin tone matches. It is necessary to make the area for matches as small as possible in order to reduce the potential for false positives. The more a region of color that might be a skin pixel is constrained, the lower the chance of placing a pixel that is not actually skin in that region.

Consider an example of starting HSV ranges of H: $\{2,36\}$, S: $\{0,255\}$, V: $\{0,255\}$. After 100 frames, the user's orientation may have changed, darkening the entire scene and thus making the user's finger difficult to find. To calibrate in this case, the number of white pixels is maximized by testing some (or as much as all) of the values from the color space in the region where the user's finger must be located. For example, the accepted ranges may change to H: $\{7,35\}$, S: $\{4, 200\}$, V: $\{0,255\}$. Performance can be improved by, for example, identifying points of concavity to establish local maxima in the graph of pixel density as a function of the range of potential values, $F(h,s)$.

Through repeated calibration inputs, this exemplary embodiment can learn to recognize a particular user's skin tone more accurate. If multiple users use the same portable terminal, the portable terminal can be calibrated to differentiate the users by skin tone. A portable terminal according to this exemplary embodiment might be 'unlocked' only if, for example, an identified user whose skin tone the terminal recognizes makes a particular motion associated with that identification.

In step 630, a motion of the user's fingers is tracked. User inputs may be any motion or combination of motions of fingers in view of the cameras. For example, a user may move a fingertip towards the camera within a predetermined distance to select an object on a screen, and move while at approximately the same distance to manipulate the object, and move the fingertip away from the camera to release the object. This feature may be augmented by displaying the view of the back camera superimposed over the normal display. Thus, the user may 'see' his finger 'tap' the object apparently from the back of the display and as it moves the object. This may help the user easily determine the initial or new location of the cursor.

Other exemplary detected motions might include a pinching motion of fingers or thumb and fingers, a spreading motion, a flicking motion, a curling motion, crossing of fingers, etc. In step 640, a corresponding function is executed according to the tracked motion. Various motions may be predefined to have specific meanings or functions in the portable terminal. Alternatively, the user may arbitrarily assign any desired meaning or effect to any recognized motion or combination of motions.

In one example, a remote control may be programmed by the user or the manufacturer to control an audiovisual system, such as channel, volume, input source, picture adjustments, selection of special features such as subtitles or alternate audio tracks, etc., according to finger locations and movements.

In a second exemplary embodiment, a portable terminal includes at least one touch sensitive input on the front, back, or sides. The touch inputs are positioned to be accessible to the user's fingers of a hand holding the device. The touch inputs track various movements and motions of one or more of a user's fingers touching the touch inputs to move a cursor, select an object at the cursor location, adjust objects, etc. In this exemplary embodiment, the user's fingers can reproduce the functionality of a desktop computer mouse. The touch inputs may, for example, be implemented as touchpads or as capacitive or resistive digital touchscreens. The touch inputs may have a predetermined location on the portable terminal, or may be virtual touch inputs such as a tracking pad area that is positioned according to the user's grip and finger locations. Use of the touchpad or virtual touchpad input is similar to the related art in that the touchpad or virtual touchpad will generally correspond to the display space, touching various points in the touchpad will move the cursor to the corresponding point in the display space, the user may tap to click, etc. Additional touch or button inputs may indicate other input functions; for example, a user may move the cursor to a starting position of text, tap another area of the touchpad to indicate highlighting, slide the first finger in contact with the touchpad to highlight selected text, and tap the second finger on an area of the touchpad to indicate the highlighted text should be cut, deleted, underlined, etc.

If the touch inputs are implemented as virtual touchpads, then the user may use any grip on any side of the portable terminal comprising a touchscreen or touchpad, and the virtual touchpad will then be located accordingly, such as at the fingertip area of the user's index finger or thumb. That is, the location of the virtual touchpads will be determined in accordance with the detected positions of the user's thumbs and fingers.

Functionality of this exemplary embodiment is similar to the first embodiment, with the primary differences being that this exemplary embodiment cannot detect skin tone and can only determine the shapes of the direct contacts. That is, in this exemplary embodiment, the device is unable to sense an input from fingers when they are not in physical contact with the touch input.

In a third exemplary embodiment, a portable terminal includes at least one joystick input positioned according to the user's grip of the portable terminal The joysticks move the cursor when pushed in a direction; unlike the touch inputs above, the joystick will cause the cursor to move for as long as the joystick is off center, even if the joystick is held still in the off-center position. Specific positions of the joystick correspond not to specific locations of the display, but instead are vector inputs corresponding to directions and speeds of the cursor's movement. The joystick may be physical or virtual. A virtual joystick may have a predetermined location on the device, or may be positioned according to the user's grip and finger locations. A physical or virtual joystick located other than on the front face of the device may also have a corresponding visual indication on the display of the joystick's position.

In a fourth exemplary embodiment, a portable terminal includes at least one virtual button. The at least one virtual button comprises a layout on the portable terminal which is based on a position of the user's hands or fingers on the front, edges, or back of the portable terminal. The virtual buttons would thus be positioned to be located in relation to the user's grip, regardless of where the user grips the portable terminal. Thus, the user does not need to adjust or change grips to use the virtual buttons. This exemplary embodiment may be combined with the above embodiments; for example, a virtual button may be summoned or dismissed if the device recognizes a particular movement and skin tone of a user.

In a fifth exemplary embodiment, a portable terminal includes at least one physical or virtual button on the front, back, or sides. Selecting the physical or virtual button notifies the system whether it should respond to events detected by a camera, joystick, or touch input. This exemplary embodiment can of course be combined with the above exemplary embodiments. For example, a virtual joystick might by default be located at the user's index fingertip or thumb, and virtual buttons might similarly be located at the user's other fingertips.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a portable device, the method comprising:
    finding at least one object to be tracked in view of a camera;
    determining a range of values corresponding to the at least one object;
    dynamically adjusting the range of values on each frame or at specific intervals of frames by repeating calibration inputs in a region where the at least one object must be located;
    detecting a motion of the at least one object;
    eliminating changes in camera input other than the detected motion of the at least one object;
    tracking the motion of the at least one object; and
    executing a function according to the tracked motion.

2. The method of claim 1,
    wherein the at least one object comprises a part of the user's body, and
    wherein the eliminating comprises:
        identifying camera input which may be skin tones;
        removing camera input not identified as the camera input which may be skin tones; and
        finding a region comprising a contiguous area of camera input which may be skin tones and which match a shape of the part of the user's body.

3. The method of claim 2, wherein the contiguous area of camera input which may be skin tones comprises camera input within the adjusted range of values of a color space.

4. The method of claim 3, wherein the values are in a form of a Hue, Saturation, and Value (HSV) color space.

5. The method of claim 3, wherein the range of values is dynamically adjusted at predetermined intervals of one or more frames to dynamically change a density of the region.

6. The method of claim 2, wherein camera input which may be skin tones outside the region is minimized.

7. The method of claim 2, wherein an area of the region is minimized.

8. The method of claim 1, wherein the tracked motion comprises one or more of a finger moving closer to the camera, a finger moving farther from the camera, a finger pointing in a direction, a finger moving translationally, a finger bending, a finger unbending, two or more fingers pinching together, two or more fingers spreading apart, two or more fingers crossing, two or more fingers uncrossing, and one or more fingers posing in predetermined arrangements.

9. The method of claim 1, wherein the function comprises a cursor function.

10. The method of claim 1, wherein the at least one object is determined according to a user input.

11. The method of claim 10, wherein the determining of the at least one object comprises:
    photographing the at least one object against a uniform background one or more times from one or more perspectives; and
    using at least one of edge-detection and feature detection to determine the at least one object in the photographs.

12. The method of claim 1, further comprising projecting visible or infrared light onto the at least one object, the visible or infrared light comprising one or more colors or wavelengths,
    wherein at least one of the one or more colors or wavelengths improves a detected contrast between the at least one object and the camera input other than the at least one object.

13. A portable device comprising:
    a camera; and
    a controller, for detecting at least one thumb or finger of a user in a frame captured by the camera, for determining a range of values corresponding to the at least one thumb or finger, for dynamically adjusting the range of values on each frame or at specific intervals of frames by repeating calibration inputs in a region where the at least one thumb or finger must be located, for detecting a motion of the at least one thumb or finger, for eliminating changes in pixels other than the detected motion of the at least one thumb or finger, for tracking a motion of the thumb or finger, and for executing a function of the device according to the tracked motion.

14. The device of claim 13, wherein the detecting of the thumb or finger comprises the controller identifying pixels which may comprise skin tones and identifying a region of the frame comprising the pixels which may comprise skin tones in a shape of a thumb or finger.

15. The device of claim 14, wherein the identifying of the pixels comprises adjusting the range of values to minimize a size of the region comprising the pixels which may comprise skin tones in the shape of the thumb or finger.

16. The device of claim 15, wherein the range of values is in a form of Hue, Saturation, and Value (HSV).

* * * * *